United States Patent
Kaigawa (10) Patent No.: US 9,204,014 B2
(45) Date of Patent: *Dec. 1, 2015

(54) SCANNER DEVICE AND METHOD EXECUTED IN SCANNER DEVICE

(71) Applicant: BROTHER KOGYO KABUSHIKI KAISHA, Nagoya-shi, Aichi-ken (JP)

(72) Inventor: Shinsuke Kaigawa, Kitanagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/220,582

(22) Filed: Mar. 20, 2014

(65) Prior Publication Data

US 2014/0204434 A1     Jul. 24, 2014

Related U.S. Application Data

(63) Continuation of application No. 13/180,352, filed on Jul. 11, 2011, now Pat. No. 8,730,546.

(30) Foreign Application Priority Data

Jul. 9, 2010  (JP) ................................ 2010-157198

(51) Int. Cl.
*H04N 1/46*     (2006.01)
*H04N 1/60*     (2006.01)

(52) U.S. Cl.
CPC ............. *H04N 1/6008* (2013.01); *H04N 1/603* (2013.01); *H04N 1/6072* (2013.01)

(58) Field of Classification Search
None
See application file for complete search history.

(56) References Cited

U.S. PATENT DOCUMENTS

| | | |
|---|---|---|
| 6,128,407 A | 10/2000 | Inoue et al. |
| 6,266,152 B1 | 7/2001 | Nakajima |
| 6,424,352 B1 | 7/2002 | Sharma et al. |
| 6,650,772 B1 | 11/2003 | Inoue et al. |
| 6,693,718 B1 | 2/2004 | Takaoka |
| 6,762,863 B1 | 7/2004 | Minakuti et al. |
| 7,474,783 B2 | 1/2009 | Sharma et al. |
| 7,599,078 B2 | 10/2009 | Sano |
| 7,986,436 B2 | 7/2011 | Umezawa |
| 2001/0041001 A1 | 11/2001 | Kawakami et al. |

(Continued)

FOREIGN PATENT DOCUMENTS

| | | |
|---|---|---|
| CN | 1471689 A | 1/2004 |
| CN | 101163181 A | 4/2008 |

(Continued)

OTHER PUBLICATIONS

Japan Patent Office, Notification of Reasons for Refusal for Japanese Patent Application No. 2010-157198 (counterpart to above-captioned patent application), dispatched May 1, 2012.

(Continued)

*Primary Examiner* — Kimberly A Williams
(74) *Attorney, Agent, or Firm* — Merchant & Gould PC (57) ABSTRACT

A scanner device and a method executed in the scanner device are provided. The scanner device includes a generating unit that generates original image data representing a scanned original; a preparing unit that prepares one color-conversion profile among a plurality of color-conversion profiles having different data sizes, according to a feature of the original image data; and an outputting unit that outputs the original image data and the one color-conversion profile.

18 Claims, 4 Drawing Sheets

(56) References Cited

U.S. PATENT DOCUMENTS

| | | |
|---|---|---|
| 2002/0159083 A1 | 10/2002 | Arai et al. |
| 2003/0081954 A1 | 5/2003 | Niikawa et al. |
| 2004/0021879 A1 | 2/2004 | Castelltort et al. |
| 2004/0264768 A1 | 12/2004 | Sharma et al. |
| 2004/0264769 A1 | 12/2004 | Sharma et al. |
| 2004/0264770 A1 | 12/2004 | Sharma et al. |
| 2004/0264771 A1 | 12/2004 | Sharma et al. |
| 2005/0146747 A1 | 7/2005 | Meisner et al. |
| 2005/0190387 A1 | 9/2005 | Hoshii |
| 2006/0066887 A1 | 3/2006 | Saida et al. |
| 2006/0087696 A1 | 4/2006 | Lee |
| 2008/0084570 A1 | 4/2008 | Cho et al. |
| 2008/0137116 A1 | 6/2008 | Lee et al. |
| 2009/0086272 A1 | 4/2009 | Januszewski et al. |
| 2009/0147288 A1 | 6/2009 | Matsuda |
| 2009/0290173 A1 | 11/2009 | Umezawa |
| 2009/0303261 A1 | 12/2009 | Fard |
| 2010/0123911 A1 | 5/2010 | Guay |
| 2010/0220926 A1 | 9/2010 | Monga et al. |
| 2011/0051206 A1 | 3/2011 | Sitter et al. |
| 2011/0285766 A1 | 11/2011 | Herold et al. |
| 2012/0274959 A1 | 11/2012 | Lee et al. |
| 2015/0181081 A1* | 6/2015 | Hakamada .................... 358/2.1 |

FOREIGN PATENT DOCUMENTS

| | | |
|---|---|---|
| CN | 101452533 A | 6/2009 |
| EP | 0961481 A2 | 12/1999 |
| EP | 0967790 A2 | 12/1999 |
| JP | H09-270929 A | 10/1997 |
| JP | H10-191915 A | 7/1998 |
| JP | H11-289467 A | 10/1999 |
| JP | 2001-016449 A | 1/2001 |
| JP | 2001-094694 A | 4/2001 |
| JP | 2001-128018 A | 5/2001 |
| JP | 2001-320595 A | 11/2001 |
| JP | 2002-094825 A | 3/2002 |
| JP | 2003-058354 A | 2/2003 |
| JP | 2003-125418 A | 4/2003 |
| JP | 2003-153020 A | 5/2003 |
| JP | 2004-172809 A | 6/2004 |
| JP | 2005-198000 A | 7/2005 |
| JP | 2005-238476 A | 9/2005 |
| JP | 2008-245029 A | 10/2008 |

OTHER PUBLICATIONS

Japan Patent Office, Decision to Grant for Japanese Patent Application No. 2010-157198 (counterpart to above-captioned patent application), dispatched Jul. 24, 2012.

European Patent Office, extended European Search Report for European Patent Application No. 12180899.2 (counterpart European patent application), dated Oct. 19, 2012.

European Patent Office, extended European Search Report for European Patent Application No. 11170568.7 (counterpart to above-captioned patent application), dated Oct. 5, 2011.

State Intellectual Property Office of the People'S Republic of China, Notification of the First Office Action for Chinese Patent Application No. 201110196169.5 (counterpart to above-captioned patent application), mailed Aug. 26, 2013.

Chinese Office Action issued in related applicatin CN 201110196169.6, mailed Sep. 4, 2014.

* cited by examiner

HIGH-QUALITY ICC PROFILE 30 ($21^3$ GRIDS)

FIG. 2B

LOW-QUALITY ICC PROFILE 32 ($17^3$ GRIDS)

FIG. 2C

MONOCHROME ICC PROFILE 34 (21 GRIDS)

FIG. 2D $\text{Gray}' = (\text{Gray}/255)^{\gamma_{gray}}$ $$\begin{bmatrix} X \\ Y \\ Z \end{bmatrix} = \begin{bmatrix} a1 \\ a2 \\ a3 \end{bmatrix} [\text{Gray}']$$

MONOCHROME ICC PROFILE 36

SCANNER DEVICE AND METHOD EXECUTED IN SCANNER DEVICE

CROSS-REFERENCE TO RELATED APPLICATION

This application is a continuation of U.S. patent application Ser. No. 13/180,352, filed on Jul. 11, 2011, which claims priority from Japanese Patent Application No. 2010-157198 filed on Jul. 9, 2010, the disclosures of which are incorporated herein by reference in their entirety.

TECHNICAL FIELD

Aspects of the present invention relate to a scanner device that outputs original image data representing a scanned original and a color-conversion profile to the outside and a method executed in the scanner device.

In a related art, a scanner device attaches a profile compliant with the international color consortium (ICC) to image data representing a scanned original. In this technique, the scanner device selects one profile from a plurality of profiles stored in the scanner device in advance according to a kind of the original specified on the basis of base data of the original (printing paper, art paper, or the like), and attaches the selected profile to the image data. A device using the image data can utilize the profile attached to the image data to perform color conversion (for example, color conversion from RGB to XYZ) on the image data.

In the above-described technique, it is not specifically disclosed how the plurality of profiles differ.

SUMMARY

Accordingly, it is an aspect of the present invention to provide a technique capable of outputting an appropriate color-conversion profile.

According to an illustrative embodiment of the present invention, there is provided a scanner device including a generating unit, a preparing unit and an outputting unit. The generating unit generates original image data representing a scanned original. The preparing unit prepares one color-conversion profile among a plurality of color-conversion profiles having different data sizes, according to a feature of the original image data. The outputting unit outputs the original image data and the one color-conversion profile.

A control method, a computer program, and a computer-readable storage medium for storing the computer program for implementing the functions of the scanner device are also new and useful.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

First Illustrative Embodiment

Configuration of System

Figure 1:
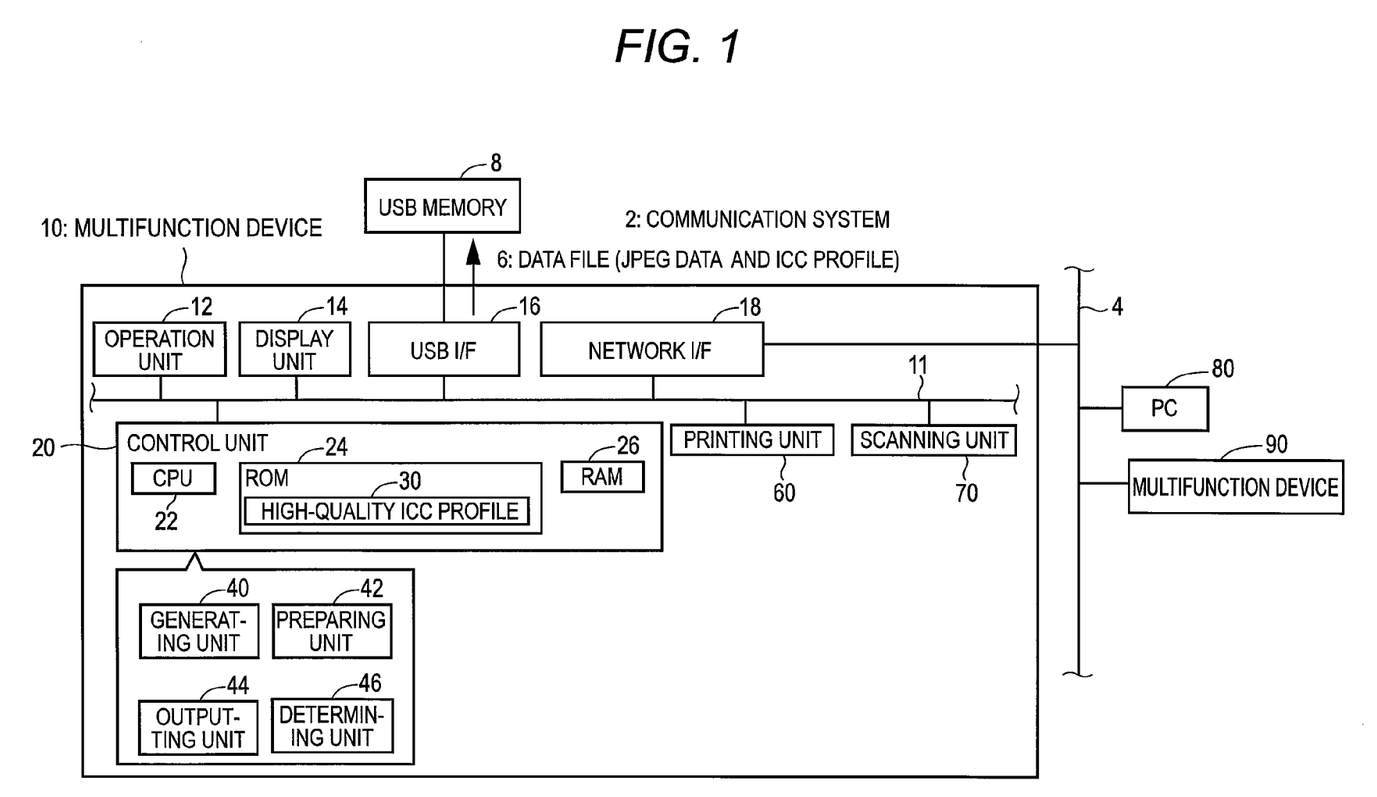
FIG. 1 shows a configuration of a communication system.

A first illustrative embodiment will be described with reference to the accompanying drawings. As shown in FIG. 1, a communication system 2 includes a personal computer (PC) 80, and multifunction devices 10 and 90 which are peripheral devices of the PC 80. The PC 80 and the multifunction devices 10 and 90 are capable of communicating with one another through a network cable 4.

(Configuration of Multifunction Device 10)

A configuration of the multifunction device 10 will be described. The multifunction device 90 has the same configuration as the multifunction device 10. The multifunction device 10 is configured to perform a plurality of functions including a printing function and a scanning function. The multifunction device 10 includes an operation unit 12, a display unit 14, a USB interface 16, a network interface 18, a control unit 20, a printing unit 60, and a scanning unit 70. Each of the units 12 to 20, 60, and 70 is connected to a bus line 11. The operation unit 12 includes a plurality of keys. A user can input various instructions to the multifunction device 10 by operating the operation unit 12. The display unit 14 is configured to display various kinds of information. In the USB interface 16, an USB memory 8 which is an external memory portable by the user is installed. The network interface 18 is connected with the network cable 4.

The control unit 20 includes a CPU 22, a ROM 24, and a RAM 26. The CPU 22 performs various processes according to a program (not shown) stored in the ROM 24. The CPU 22 performs processes according to the program so as to realize the functions of a generating unit 40, a preparing unit 42, an outputting unit 44, and a determining unit 46. The ROM 24 stores a high-quality ICC profile 30. The high-quality ICC profile 30 is stored in the ROM 24 in advance by a vendor of the multifunction device 10.

The high-quality ICC profile 30 is a so-called input-side ICC profile. The high-quality ICC profile 30 is a profile for converting image data which is represented by device-dependent colors depending on the characteristics (particularly, color characteristics) of the multifunction device 10, into intermediate image data which is represented by device-independent colors independent from the characteristics of the device. Specifically, the high-quality ICC profile 30 is an ICC profile in which a plurality of sets of coordinate values in an RGB color space are associated with a plurality of sets of coordinate values in an XYZ color space. Hereinafter, image data in which a value of each pixel is represented by coordinate values in the RGB color space is referred to as RGB image data, and image data in which a value of each pixel is represented by coordinate values in the XYZ color space is referred to as XYZ image data.

Figure 2A:
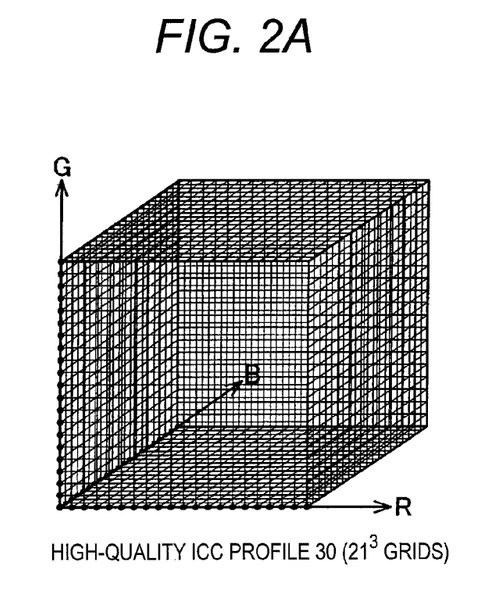
FIGS. 2A to 2D schematically show ICC profiles.

For example, if an ICC profile in which $256^3$ sets of coordinate values in the RGB color space are respectively associated with $256^3$ sets of coordinate values in the XYZ color space is used, it is possible to accurately convert RGB image data with a 256 tone level to XYZ image data. However, such an ICC profile has a massive data size. In the first illustrative embodiment, in order to reduce the data size of the ICC profile, a profile in which $21^3$ sets of coordinate values in the RGB color space (hereinafter, referred to as $21^3$ sets of RGB coordinate values) are associated with $21^3$ sets of coordinate values in the XYZ color space (hereinafter, referred to as $21^3$ sets of XYZ coordinate values) is used as the high-quality ICC profile 30. FIG. 2A schematically shows the $21^3$ sets of RGB coordinate values (that is, $21^3$ lattice points (grids)) included in the high-quality ICC profile 30. The XYZ coordinate values are respectively assigned to each lattice point.

For example, if a value of a first pixel included in the RGB image data is represented by first RGB coordinate values (R1, G1, B1), and the $21^3$ sets of RGB coordinate values of the high-quality ICC profile 30 includes the exact first RGB coordinate values (R1, G1, B1), a certain device (for example, the PC 80) using the RGB image data can convert the first RGB coordinate values (R1, G1, B1) into first XYZ coordinate values (X1, Y1, Z1). Also, for example, even if a value of a second pixel included in the RGB image data is represented by second RGB coordinate values (R2, G2, B2), and the $21^3$ sets of RGB coordinate values of the high-quality ICC profile 30 does not includes the exact second RGB coordinate values (R2, G2, B2), the certain device can convert the second RGB coordinate values (R2, G2, B2) into second XYZ coordinate values (X2, Y2, Z2) by using the high-quality ICC profile 30. For example, the certain device performs an interpolation process on the basis of the relationship between one or more sets of RGB coordinate values (Rn, Gn, Bn) (for example, one or more sets of RGB coordinate values in the vicinity of the second RGB coordinate values (R2, G2, B2)) of the $21^3$ sets of RGB coordinate values and one or more sets of XYZ coordinate values (Xn, Yn, Zn) associated with the one or more sets of RGB coordinate values (Rn, Gn, Bn) so as to convert the second RGB coordinate values (R2, G2, B2) into the second XYZ coordinate values (X2, Y2, Z2).

Figure 2B:
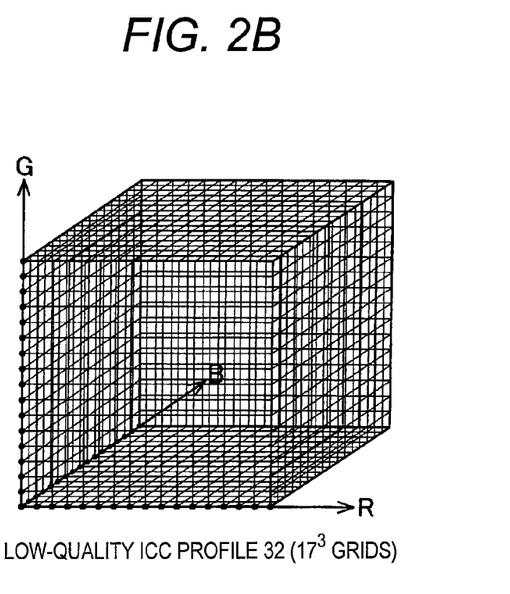
Figure 2C:
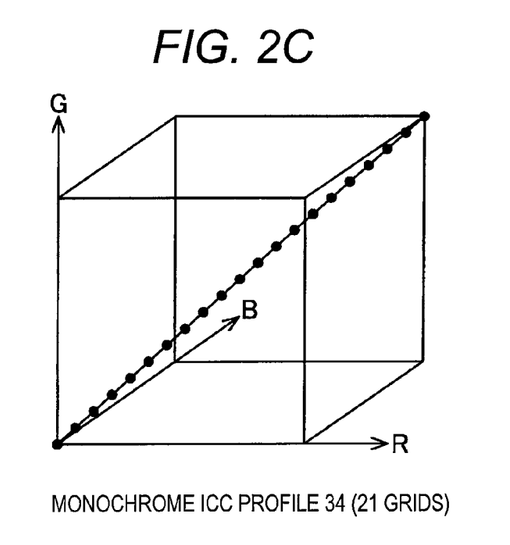
Figure 2D:
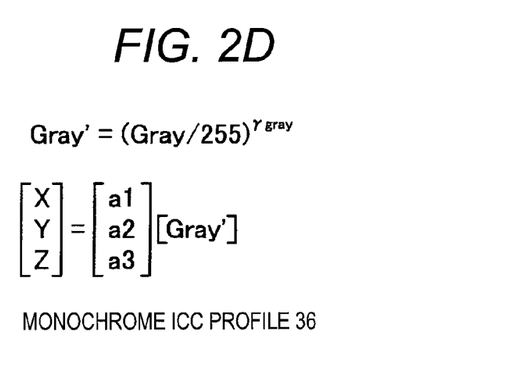

FIGS. 2B and 2C respectively show a low-quality ICC profile 32 and a monochrome ICC profile 34 to be described below. It is noted that in the ROM 24, only the high-quality ICC profile 30 is stored, and the low-quality ICC profile 32 and the monochrome ICC profile 34 are not stored. Although will be described below, the preparing unit 42 generates each of the profiles 32 and 34 by using the high-quality ICC profile 30 so as to prepare each of the profiles 32 and 34. A monochrome ICC profile 36 shown in FIG. 2D is used in a second illustrative embodiment to be described below.

The printing unit 60 has a printing mechanism of an inkjet type, a laser type, or the like. For example, if receiving print data transmitted from the PC 80 by the network interface 18, the printing unit 60 performs a printing process according the received print data. The scanning unit 70 includes a transparent platen, an automatic document feeder (ADF), and a scanning mechanism. The scanning mechanism includes an image sensor such as a CCD, a CIS, or the like. The scanning unit 70 scans an original (a scan subject) to generate scan data. The scan data is bitmap data of a 256 tone level of RGB.

Although described below in the detail, the generating unit 40 generates JPEG-formatted data (hereinafter, referred to as JPEG data) by using the scan data generated by the scanning unit 70. The JPEG data includes various kinds of information such as a JPEG header, a JPEG footer, and the like, and JPEG image data acquired from the scan data. The JPEG image data is also image data of a 256 tone level of RGB. However, the JPEG image data is included in the JPEG data in a compressed state.

(Processes Performed by Multifunction Device 10)

The contents of processes performed by the multifunction device 10 will be described with reference to FIGS. 3 and 4. If the user performs predetermined operation, the control unit 20 performs a scanning process shown in FIG. 3. The predetermined operation includes installing the USB memory 8 in the USB interface 16, mounting an original on the transparent platen or the automatic document feeder, and inputting instructions of scan conditions to the operation unit 12.

The scan conditions include a scan resolution (which is one of 100 dpi, 200 dpi, 300 dpi, and 600 dpi), an image color mode (which is one of a color mode, a monochrome mode, and an automatic mode), and a file size (which is one of a large size and a small size). If a user wants to generate JPEG image data representing a color image, the user selects the color mode as the image color mode, and if a user wants to generate JPEG image data representing a monochrome image, the user selects the monochrome mode as the image color mode. Further, if a user wants to automatically generate JPEG image data representing a color or monochrome image according to an original, the user selects the automatic mode as the image color mode. Furthermore, if a user wants a compression rate of JPEG image data to be low, the user selects the large size as the file size, and if a user wants the compression rate of the JPEG image to be high, the user selects the small size as the file size.

In step S10, the determining unit 46 (see FIG. 1) acquires the scan conditions (that is, the scan resolution, the image color mode, and the file size) instructed by the user. Next, in step S12, the control unit 20 instructs the scanning unit 70 to perform scanning according to the scan resolution acquired in step S10. As a result, the scanning unit 70 scans an original, and generates scan data. In step S12, the scanning unit 70 performs color scanning using image sensors of three colors of RGB, regardless of the image color mode selected by the user (for example, even when the monochrome mode is selected).

Subsequently, in step S14, the determining unit 46 determines whether the image color mode acquired in step S10 is the automatic mode or not. If the image color mode acquired in step S10 is the automatic mode, in the step 14, the determination result of the determining unit 46 is Yes, and then, the scanning process proceeds to step S16. Meanwhile, if the image color mode acquired in step S10 is the color mode or the monochrome mode, in step S14, the determination result of the determining unit 46 is No, and then, the scanning process proceeds to step S20. In step S20, the determining unit 46 determines whether the image color mode acquired in step S10 is the monochrome mode or not. If the image color mode acquired in step S10 is the monochrome mode, in step S20, the determination result of the determining unit 46 is Yes, and then, the scanning process proceeds to step S22. Meanwhile, if the image color mode acquired in step S10 is the color mode, in step S20, the determination result of the determining unit 46 is No, and then, the scanning process proceeds to step S24.

In step S16, the determining unit 46 analyzes the scan data generated in step S12 to determine whether an image represented by the scan data is a color image or a monochrome image. Specifically, the determining unit 46 first specifies RGB values of one pixel of a plurality of pixels constituting the scan data. Next, the determining unit 46 determines whether a difference between a maximum value and a minimum value of the specified RGB values is smaller than a predetermined value or not. If it is determined that the difference is smaller than the predetermined value, the determining unit 46 further performs the same determination on another pixel of the plurality of pixels constituting the scan data. If it is determined on all of the plurality of pixels constituting the scan data that the difference is smaller than the predetermined value, the determining unit 46 determines that the image represented by the scan data is a monochrome image. Meanwhile, if it is determined on at least one pixel that the difference is not smaller than the predetermined value, the determining unit 46 determines that the image represented by the scan data is a color image. After step S16, the scanning process proceeds to step S18.

In step S18, the determining unit 46 determines whether the analysis result in step S16 is the monochrome image or not. If the analysis result in step S16 is a monochrome image, in step S18, the determination result of the determining unit 46 is Yes, and then, the scanning process proceeds to step S22. Meanwhile, if the analysis result in step S16 is a color image, in step S18, the determination result of the determining unit 46 is No, and then, the scanning process proceeds to step S24.

In step S22, the generating unit 40 (see FIG. 1) performs a monochrome correction process on the scan data. Specifically, the generating unit 40 first specifies one pixel (hereinafter, referred to as a subject pixel) of the plurality of pixels constituting the scan data. Next, the generating unit 40 corrects the RGB values of the subject pixel such that each of the corrected RGB values of the subject pixel is equal to an average value of the uncorrected RGB values of the subject pixel. Therefore, the corrected RGB values of the subject pixel become the same value. The generating unit 40 performs the same correction on each of all the other pixels constituting the scan data as subject pixels. As a result, corrected scan data in which the RGB values of each pixel are the same value is acquired. After S22, the scanning process proceeds to step S24.

In step S24, the generating unit 40 generates JPEG data by using the scan data. Specifically, if step S22 is performed, in step S24, the generating unit 40 generates the JPEG data by using the corrected scan data generated in step S22, and if step S22 is not performed, in step S24, the generating unit 40 generates the JPEG data by using the scan data generated in step S12. Since a method of generating the JPEG data is known, a description thereof is omitted. Nevertheless, in step S24, the generating unit 40 generates JPEG-formatted image data (JPEG image data) from the scan data, and compresses the JPEG image data. When compressing the JPEG image data, the generating unit 40 uses a compression rate according to the file size acquired in step S10. That is, if the file size acquired in step S10 is the small size, the generating unit 40 uses a relatively high compression rate to compress the JPEG image data. If the file size acquired in step S10 is the large size, the generating unit 40 uses a relatively low compression rate to compress the JPEG image data. As the compression rate is reduced, in other words, as the degree of compression is reduced, the data size of compressed JPEG image data increases. Further, as the compression rate is reduced, it is possible to reproduce the uncompressed JPEG image data from the compressed JPEG image data with a higher degree of accuracy. After step S24, the scanning process proceeds to an ICC-profile preparing process of step S26.

(ICC-Profile Preparing Process)

Figure 3:
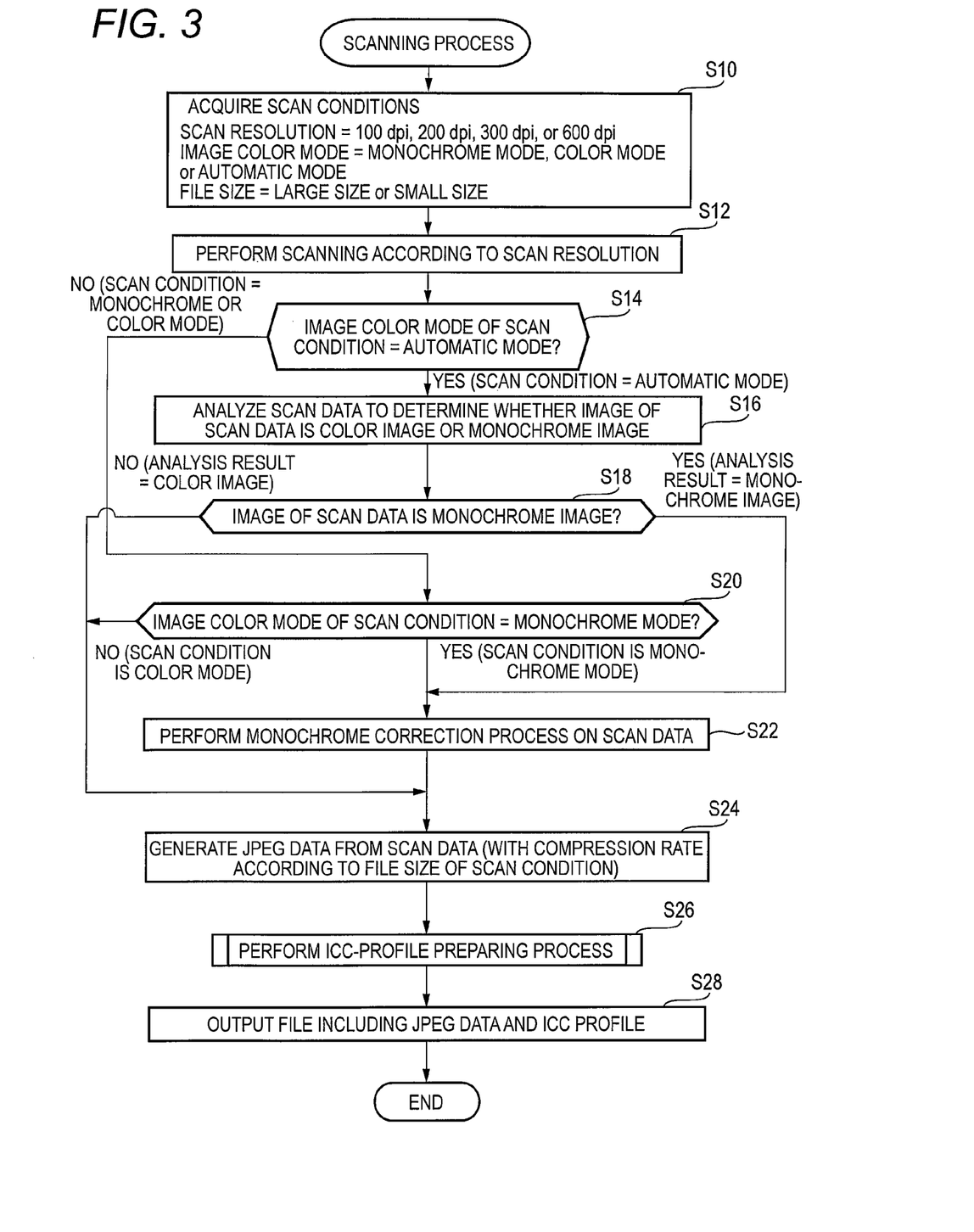
FIG. 3 shows a flow chart of a scanning process.
Figure 4:
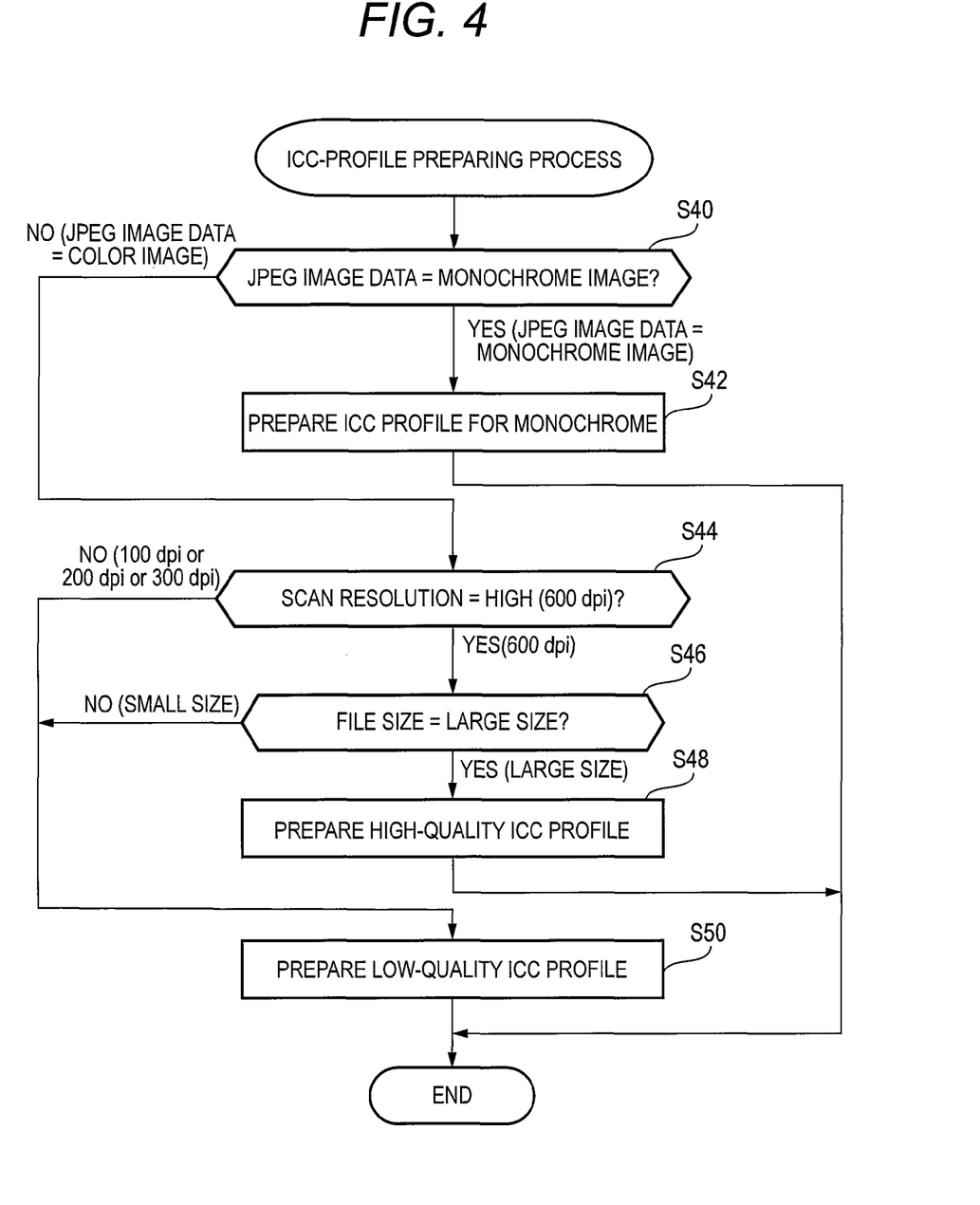
FIG. 4 shows a flow chart of an ICC profile preparing process.

As shown in FIG. 4, in step S40, the determining unit 46 determines whether the JPEG image data included in the JPEG data generated in step S24 of FIG. 3 represents a monochrome image or not. In other words, if the determination result in step S20 of FIG. 3 is Yes (the image color mode acquired in step S10 is the monochrome mode), or if the determination result in step S18 of FIG. 3 is Yes (the analysis result in step S16 is a monochrome image), in step S40, the determination result of the determining unit 46 is Yes. Meanwhile, if the determination result in step S20 of FIG. 3 is No (the image color mode acquired in step S10 is the color mode), or if the determination result in step S18 of FIG. 3 is No (the analysis result in step S16 is a color image), in step S40, the determination result of the determining unit 46 is No.

In a case of Yes in step S40 (a case where the JPEG image data represents a monochrome image), in step S42, the preparing unit 42 (see FIG. 1) prepares the monochrome ICC profile 34 (see FIG. 2C). Specifically, the preparing unit 42 first reads the high-quality ICC profile 30 stored in the ROM 24 to the RAM 26. As described above, the RGB values of each pixel of the JPEG image data representing the monochrome image are the same value. Therefore, if using an ICC profile including RGB coordinate values in which the RGB values are the same value, it is possible to appropriately convert the JPEG image data representing the monochrome image into XYZ image data. As described above, in the high-quality ICC profile 30, the $21^3$ sets of RGB coordinate values are associated with the $21^3$ sets of XYZ coordinate values. The preparing unit 42 specifies 21 sets of RGB coordinate values where the RGB values are the same value, from the $21^3$ sets of RGB coordinate values included in the high-quality ICC profile 30 read in the RAM 26. Therefore, the preparing unit 42 also specifies 21 sets of XYZ coordinate values associated with the 21 sets of RGB coordinate values. In other words, the preparing unit 42 specifies the 21 sets of RGB coordinate values and the 21 sets of XYZ coordinate values by removing out the other RGB coordinate values and the other XYZ coordinate values from the high-quality ICC profile 30. The preparing unit 42 generates the monochrome ICC profile 34 in which the 21 sets of RGB coordinate values are associated with the 21 sets of XYZ coordinate values so as to prepare the monochrome ICC profile 34.

FIG. 2C schematically shows 21 sets of RGB coordinate values (that is, 21 lattice points (grids)) included in the monochrome ICC profile 34. The number of sets of RGB coordinate values and XYZ coordinate values (each of which is 21) included in the monochrome ICC profile 34 is considerably less than the number of sets of RGB coordinate values and XYZ coordinate values (each of which is $21^3$) included in the high-quality ICC profile 30. Therefore, the data size of the monochrome ICC profile 34 is considerably smaller than the data size of the high-quality ICC profile 30. After step S42, the ICC-profile preparing process ends.

In a case of No in step S40 (a case where the JPEG image data represents a color image), in step S44, the determining unit 46 determines whether the resolution of the JPEG image data included in the JPEG data generated in step S24 of FIG. 3 is high or not. Specifically, if the scan resolution acquired in step S10 of FIG. 3 is 600 dpi, in step S44, the determination result of the determining unit 46 is Yes. Meanwhile, if the scan resolution acquired in step S10 of FIG. 3 is a value (for example, 100 dpi, etc) other than 600 dpi, in step S44, the determination result of the determining unit 46 is No.

In a case of Yes in step S44 (a case where the scan resolution is 600 dpi), in step S46, the determining unit 46 determines whether the data size of the JPEG data generated in step S24 of FIG. 3 is large or not. Specifically, if the file size acquired in step S10 of FIG. 3 is the large size (that is, the compression rate of the JPEG image data is low), in step S46, the determination result of the determining unit 46 is Yes. Meanwhile, if the file size acquired in step S10 of FIG. 3 is the small size (that is, the compression rate of the JPEG image data is high), in step S46, the determination result of the determining unit 46 is No.

In a case of Yes in step S46 (a case where the file size is the large size), in step S48, the preparing unit 42 prepares the high-quality ICC profile 30 (see FIG. 2A). Specifically, the preparing unit 42 reads the high-quality ICC profile 30 stored in the ROM 24 to the RAM 26 so as to prepare the high-quality ICC profile 30. After step S48, the ICC-profile preparing process ends.

In a case of No in step S44 (a case where the scan resolution is 100 dpi, 200 dpi, or 300 dpi), or in a case of No in step S46 (a case where the file size is the small size), in step S50, the preparing unit 42 prepares the low-quality ICC profile 32 (see FIG. 2B). Specifically, the preparing unit 42 first reads the high-quality ICC profile 30 stored in the ROM 24 to the RAM 26. Next, the preparing unit 42 specifies $17^3$ sets of RGB coordinate values, from the $21^3$ sets of RGB coordinate values included in the high-quality ICC profile 30 read to the RAM 26, and further specifies $17^3$ sets of XYZ coordinate values associated with the $17^3$ sets of RGB coordinate values, from the $21^3$ sets of XYZ coordinate values. In other words, the preparing unit 42 specifies the $17^3$ sets of RGB coordinate values and the $17^3$ sets of XYZ coordinate values by removing out the other RGB coordinate values and XYZ coordinate values from the high-quality ICC profile 30. In a modified example, the preparing unit 42 may specify the $17^3$ sets of RGB coordinate values and the $17^3$ sets of XYZ coordinate values by performing interpolation on the basis of the relationship between the RGB coordinate values and the XYZ coordinate values in the high-quality ICC profile 30. That is, the $17^3$ sets of RGB coordinate values and the $17^3$ sets of XYZ coordinate values may include RGB coordinate values and XYZ coordinate values which are not included in the $21^3$ sets of RGB coordinate values and the $21^3$ sets of XYZ coordinate values, respectively. In both of the first illustrative embodiment and the above described example, the preparing unit 42 specifies the $17^3$ sets of RGB coordinate values such that distances between two adjacent sets of RGB coordinate values are equal as possible. The preparing unit 42 generates the low-quality ICC profile 32 in which the $17^3$ sets of RGB coordinate values are associated with the $17^3$ sets of XYZ coordinate values so as to prepare the low-quality ICC profile 32.

FIG. 2C schematically shows the $17^3$ sets of RGB coordinate values (that is, $17^3$ lattice points (grids)) included in the low-quality ICC profile 32. The number of sets of RGB coordinate values and XYZ coordinate values (each of which is $17^3$) included in the low-quality ICC profile 32 is less than the number of sets of RGB coordinate values and XYZ coordinate values (each of which is $21^3$) included in the high-quality ICC profile 30. Therefore, the data size of the low-quality ICC profile 32 is smaller than the data size of the high-quality ICC profile 30. Further, the number of sets of RGB coordinate values and XYZ coordinate values (each of which is $17^3$) included in the low-quality ICC profile 32 is greater than the number of sets of RGB coordinate values and XYZ coordinate values (each of which is 21) included in the monochrome ICC profile 34. Therefore, the data size of the low-quality ICC profile 32 is larger than the data size of the monochrome ICC profile 34. After step S50 ends, the ICC-profile preparing process ends.

As described above, in the first illustrative embodiment, the preparing unit 42 generates the ICC profiles 32 and 34 from the high-quality ICC profile 30 so as to prepare the ICC profiles 32 and 34. Since it is not required to store the ICC profiles 32 and 34 in the ROM in advance, it is possible to reduce an amount of data in the ROM 24. In a modified example, not only the high-quality ICC profile 30 but also the ICC profiles 32 and 34 may be stored in the ROM in advance. In this case, the preparing unit 42 can read the ICC profiles 32 and 34 stored in the ROM 24 to the RAM 26 so as to prepare the ICC profiles 32 and 34. In this modified example, since the preparing unit 42 need not generate the ICC profiles 32 and 34, the preparing unit 42 can quickly prepare the ICC profiles 32 and 34.

If the ICC-profile preparing process ends, the scanning process proceeds to step S28 of FIG. 3. In step S28, the outputting unit 44 (see FIG. 1) outputs one data file 6 (see FIG. 1) including the JPEG data generated in step S24 and one ICC profile prepared in the ICC-profile preparing process of step S26, to the outside. Specifically, the outputting unit 44 writes the one data file in the USB memory 8. After step S28, the scanning process ends.

It is noted that, since the JPEG data and the prepared ICC profile are included in the same data file 6, the process of step S28 is also referred to as a process of outputting the JPEG data and the prepared ICC profile to the outside while associating with each other. The associating can be performed in various forms. In a first modified example, the outputting unit 44 performs the associating by outputting one folder including a file of the JPEG data, and the prepared ICC profile different from the file of the JPEG data. In a second modified example, the outputting unit 44 performs the associating by including information on the prepared ICC profile (for example, a file name of the prepared ICC profile) in the file of the JPEG data. In a third modified example, the outputting unit 44 performs the associating by outputting the file of the JPEG data, the prepared ICC profile different from the file of the JPEG data, and information for liking the file of the JPEG data with the prepared ICC profile.

(Process of External Device)

The user can carry the USB memory 8 including the data file 6. The user can install the USB memory 8 in the USB interface of the PC 80 (that is, an external device) and read the data file 6 in the USB memory 8 to the PC 80. In this case, a control unit (not shown) of the PC 80 decompresses the compressed JPEG image data included in the JPEG data in the data file 6. Next, the control unit of the PC 80 coverts the decompressed JPEG image data (RGB bitmap data) into XYZ image data by using the ICC profile (any one of the high-quality ICC profile, the low-quality ICC profile, and the ICC profile for monochrome) in the data file 6. Specifically, the control unit of the PC 80 converts each pixel represented by RGB coordinate values included in the JPEG image data into each pixel represented by XYZ coordinate values so as to generate the XYZ image data.

The control unit of the PC 80 further converts the XYZ image data into output image data represented by device-dependent colors depending on the characteristics of the PC 80 (particularly, the color characteristics of a monitor of the PC 80). An output-side ICC profile for performing this conversion is generally stored in the PC 80 in advance. For example, the output-side conversion profile is an ICC profile in which a plurality of sets of coordinate values in the XYZ color space are associated with a plurality of sets of coordinate values in a color space (for example, the RGB color space) corresponding to a monitor of the PC 80. The control unit of the PC 80 provides the output image data to the monitor. Therefore, an output image represented by the output image data is displayed on the monitor of the PC 80.

Effects According to First Illustrative Embodiment

The communication system 2 according to the first illustrative embodiment has been described in detail. If using the high-quality ICC profile 30, the PC 80 can convert the JPEG image data into the XYZ image data. Therefore, whatever features the generated JPEG image data has, a configuration in which the multifunction device 10 outputs the high-quality ICC profile 30 can be conceived of. However, as described above, for example, in order to convert the JPEG image data representing the monochrome image into the XYZ image data, if using an ICC profile including only RGB coordinate values where the RGB values are the same value, it is possible to perform color conversion from RGB to XYZ.

In consideration of the actual circumstances, if JPEG image data representing a color image is generated (the case of No in step S40 of FIG. 4), the multifunction device 10 according to the first illustrative embodiment prepares the high-quality ICC profile 30 or the low-quality ICC profile 32 having a relatively large data size (step S48 or S50 of FIG. 4), and if JPEG image data representing a monochrome image is generated (the case of Yes in step S40 of FIG. 4), the multifunction device 10 according to the first illustrative embodiment prepares the monochrome ICC profile 34 having a relatively small data size (step S42 of FIG. 4). If the JPEG image data representing the monochrome image is generated, it is possible to suppress the ICC profile 30 having an excessive quality from being output.

If the user instructs to generate JPEG image data having a relatively high resolution, or if the user instructs to generate JPEG image data compressed with a relatively low compression rate, the user is likely to desire to obtain an output image having image color(s), represented by the JPEG image data, faithfully reproduced. Meanwhile, if the user instructs to generate JPEG image data having a relatively low resolution, or if the user instructs to generate JPEG image data compressed with a relatively high compression rate, a request of the user on the reproducibility of colors is not expected to be high.

In consideration of the actual circumferences, if JPEG image data having a relatively high resolution is generated (a case of Yes in step S44 of FIG. 4), the multifunction device 10 according to the first illustrative embodiment prepares the high-quality ICC profile 30 having a relatively large data size (step S48 of FIG. 4), and if JPEG image data having a relatively low resolution is generated (a case of No in step S44 of FIG. 4), the multifunction device 10 prepares the low-quality ICC profile 32 having a relatively small data size (step S50 of FIG. 4). Further, if JPEG image data compressed with a relatively low compression rate is generated (a case of Yes in step S46 of FIG. 4), the multifunction device 10 prepares the high-quality ICC profile 30 having the relatively large data size (step S48 of FIG. 4), and if JPEG image data compressed with a relatively high compression rate is generated (a case of No in step S46 of FIG. 4), the multifunction device 10 prepares the low-quality ICC profile 32 having the relatively small data size (step S50 of FIG. 4). If JPEG image data having a relatively low resolution is generated, or if JPEG image data compressed with a relatively high compression rate is generated, it is possible to suppress the ICC profile 30 having an excessive quality from being output.

As described above, the multifunction device 10 according to the first illustrative embodiment can output an ICC profile having an appropriate quality (that is, an appropriate data size) according to features of generated JPEG image data. That is, it is possible to suppress the ICC profile 30 having an excessive quality from being output. As a result, it is possible to reduce the data size of the data file 6 and reduce a load of a resource (such as a load of the storage capacity of the memory, a process load of the control unit, or the like) of the PC 80 for displaying the output image by using the data file 6.

In the above, the ICC profiles 30, 32, and 34 are examples of a plurality of color-conversion profiles. The high-quality ICC profile 30 and the low-quality ICC profile 32 (or the monochrome ICC profile 34) are examples of a first first-type color-conversion profile and a second first-type color-conversion profile, respectively. $21^3$ and $17^3$ (or 21) are examples of the numbers M and N, respectively. Further, the high-quality ICC profile 30 (or the low-quality ICC profile 32) and the monochrome ICC profile 34 are examples of a first color-conversion profile and a second color-conversion profile, respectively. Furthermore, the high-quality ICC profile 30 and the low-quality ICC profile 32 are examples of a third color-conversion profile (or a fifth color-conversion profile) and a fourth color-conversion profile (or a sixth color-conversion profile), respectively. Moreover, the RGB color space and the XYZ color space are examples of a first color space and a second color space, respectively.

Second Illustrative Embodiment

Differences between a second illustrative embodiment and the first illustrative embodiment will be described. Each of the ICC profiles 30, 32, and 34 used in the first illustrative embodiment is a so-called grid-type color-conversion profile in which RGB coordinate values are associated with XYZ coordinate values. However, the second illustrative embodiment uses a monochrome ICC profile 36 (which is a so-called function-type color-conversion profile) shown in FIG. 2D, instead of the monochrome ICC profile 34 of the first illustrative embodiment. The monochrome ICC profile 36 includes functions for converting RGB coordinate values into XYZ coordinate values. In the functions, γ gray, a1, a2, and a3 are predetermined constant values. If substituting any one value (for example, an R value) of RGB coordinate values into Gray in the functions, XYZ coordinate values are obtained. As described above, in each pixel constituting JPEG image data representing a monochrome image, the RGB coordinate values are the same value. Therefore, even when any value of the RGB coordinate values of each pixel constituting the JPEG image data is substituted into the Gray in the functions, the identical XYZ coordinate values are obtained. Further, the data size of the monochrome ICC profile 36 is smaller than the data sizes of other ICC profiles 30 and 32.

The monochrome ICC profile 36 is stored in the ROM 24 in advance. In the process of step S42 of FIG. 4, the preparing unit 42 reads the monochrome ICC profile 36 stored in the ROM 24 to the RAM 26 so as to prepare the monochrome ICC profile 36 (that is, entire of the functions). The other processes are the same as those in the first illustrative embodiment. In the second illustrative embodiment, the monochrome ICC profile 36 is an example of a second-type color-conversion profile. Further, RGB coordinate values are examples of values corresponding to coordinate values in a first color space.

First Modified Example

Each of the ICC profiles 30 to 36 of the first and second illustrative embodiments may be a profile for converting RGB image data into image data (that is, L*a*b* image data) in which a value of each pixel is represented by coordinate values in an L*a*b* color space. In general, each of the plurality of color-conversion profiles may be a profile for converting image data in which a value of each pixel is represented by coordinate values in a first color space (which is the RGB color space in the first and second illustrative embodiments) into intermediate image data in which a value of each pixel is represented by coordinate values in a second color space (which is the XYZ color space in the first and second illustrative embodiments and is the L*a*b* color space in the first modified example). Further, the second color space may be the same color space as the first color space or may be a color space different from the first color space.

Second Modified Example

Similarly to the first and second illustrative embodiments, the first color space may be a color space (the RGB color space in the first and second illustrative embodiments) for representing device-dependent colors depending on the characteristics of the scanner device, or may be a standard color space (for example, an sRGB color space). Hereinafter, in a case where the first color space is the sRGB color space, a color-conversion profile is referred to as an sRGB color-conversion profile. Similarly to the first and second illustrative embodiments, in the second modified example, the generating unit 40 may generate RGB-formatted JPEG image data depending on the characteristics of the multifunction device 10, and the outputting unit 44 may output JPEG data including the RGB-formatted JPEG image data and an sRGB color-conversion profile to the outside. Alternatively, the generating unit 40 may generate sRGB-formatted JPEG image data from RGB-formatted JPEG image data depending on the characteristics of the multifunction device 10, and the JPEG data including the sRGB-formatted JPEG image data and an sRGB color-conversion profile may be output to the outside.

Moreover, for example, all of the plurality of color-conversion profiles may be sRGB color-conversion profiles, or only part of the plurality of color-conversion profiles may be sRGB color-conversion profiles. In the latter case, for example, an sRGB color-conversion profile may used as a color-conversion profile having a larger data size (for example, an sRGB color-conversion profile may be prepared in step S48 of FIG. 4), and a color-conversion profile (for example, a color-conversion profile from RGB to XYZ) of a color space other than the sRGB color space may be used as a color-conversion profile having a smaller data size (for example, a color-conversion profile from RGB to XYZ may be prepared in step S42 or S50 of FIG. 4). Alternatively, a color-conversion profile (for example, a color-conversion profile from RGB to XYZ) of a color space other than the sRGB color space may used as a color-conversion profile having a larger data size (for example, a color-conversion profile from RGB to XYZ may be prepared in step S48 of FIG. 4), and an sRGB color-conversion profile may be used as a color-conversion profile having a smaller data size (for example, an sRGB color-conversion profile may be prepared in step S42 or S50 of FIG. 4).

Third Modified Example

Similarly to the monochrome ICC profile 36 of the second illustrative embodiment, each of the ICC profiles 30 to 34 may be a profile including constant values used in function for converting coordinate values in the first color space into coordinate values in the second color space.

Fourth Modified Example

In the first and second illustrative embodiments, the outputting unit 44 writes the data file 6 in the USB memory 8 so as to output the data file 6 to the outside. However, in the fourth modified example, the outputting unit 44 of the multifunction device 10 may transmit the data file 6 to the PC (that is, an external device) 80, may transmit the data file 6 to another multifunction device 90, or may write the data file 6 in a recoding medium 5 such as a CD, a DVD, or the like installed in the multifunction device 10. In all examples, a configuration for performing output to the outside is included.

Fifth Modified Example

In the second illustrative embodiment, the monochrome ICC profile 36 of the second illustrative embodiment may include the entire functions or may include only constant values to be used in the functions without including the entire functions. In general, the second-type color-conversion profile may include at least the constant values used in the functions for converting values corresponding to coordinate values in the first color space into coordinate values in the second color space.

Sixth Modified Example

The high-quality ICC profile 30 may not be stored in the ROM 24 in advance. For example, when performing the process of step S50 of FIG. 4, the preparing unit 42 may acquire the high-quality ICC profile 30 from an external device (for example, a server provided by the vendor of the multifunction device 10) so as to prepare the high-quality ICC profile 30. Similarly, when performing the processes of step S42 and S50 of FIG. 4, the preparing unit 42 may acquire the ICC profiles 32 to 36 from an external device so as to prepare the ICC profiles 32 to 36.

Seventh Modified Example

Each pixel constituting JPEG image data representing a monochrome image may not be represented by RGB values (that is, a set of coordinate values (three values)) but may be represented by one value regarding brightness obtained from the RGB values. In this case, the ICC profiles 34 and 36 for monochrome may be profiles for converting values regarding the brightness into coordinate values in the XYZ color space. For example, the monochrome ICC profile 34 of the first illustrative embodiment may be a profile in which 21 values regarding the brightness obtained from the 21 sets of RGB coordinate values are associated with 21 sets of XYZ coordinate values. In a seventh modified example, the 21 values regarding the brightness are examples of N values corresponding to N coordinate values in the first color space. Further, the monochrome ICC profile 36 of the second illustrative embodiment may include constant values used in functions for converting values regarding the brightness into coordinate values in the XYZ color space. In the seventh modified example, the values regarding the brightness are examples of the values corresponding to the coordinate values in the first color space. In general, the values (or N values) corresponding to the coordinate values (N coordinate values) in the first color space may be coordinate values in the first color space, like the first and second illustrative embodiments, or may be values (for example, values regarding the brightness) obtained from the coordinate values in the first color space, like the seventh modified example.

Eighth Modified Example

In the first and second illustrative embodiments, in step S16 of FIG. 3, the determining unit 46 analyzes the scan data. However, the determining unit 46 may analyze the JPEG data (data such as a JPEG header, a JPEG footer, JPEG image data, or the like) to determine whether the image represented by the JPEG data is a color image or a monochrome image. In general, the determining unit 46 may analyze image data obtained when original image data is generated, so as to determine the features of the original image data. Further, in the first and second illustrative embodiments, in step S16 of FIG. 3, the determining unit 46 determines a feature representing whether the image represented by the scan data is a color image or a monochrome image by analyzing the scan data. However, the determining unit 46 may determine other features. For example, the determining unit 46 may determine the resolution and/or the data size (compression rate) by analyzing the image data obtained when the original image data is generated.

Ninth Modified Example

In the first and second illustrative embodiments, the generating unit 40 generates original image data having a JPEG format. However, the generating unit 40 may generate original image data having a format (for example, a TIFF format or a BMP format) other than the JPEG format.

Specific illustrative embodiments and modified examples have been described in detail above; however, these examples are merely illustrative, and do not restrict the scope of the claims. Any of various modifications and changes of the specific examples illustrated above are included in the scope of the claims.

Moreover, the technical elements described in the present specification and drawings exhibit technical utility either alone or in any of various combinations, and there is no limitation to the combinations described in the claims at the time of filing. Moreover, the art illustrated in the present specification and drawings attains a plurality of objects simultaneously, but there is technical utility in attaining one of these objects.

What is claimed is:

1. A scanner device comprising:
a scanning unit having an image sensor;
a controller configured to:
control the scanning unit to scan an original by the image sensor at a particular resolution;
generate original image data representing the scanned original;
determine whether the particular resolution is a first resolution or a second resolution, the second resolution being less than the first resolution;
if the particular resolution is the first resolution,
prepare a first color-conversion profile among a plurality of color-conversion profiles having different data sizes, the first color-conversion profile having a first data size; and
output the original image data and the first color-conversion profile to an outside;
if the particular resolution is the second resolution prepare a second color-conversion profile among the plurality of color-conversion profiles, the second color-conversion profile having a second data size, the second data size being less than the first data size; and
output the original image data and the second color-conversion profile to the outside.

2. The scanner device according to claim 1,
wherein the plurality of color-conversion profiles include:
a first-type color-conversion profile in which a plurality of sets of coordinate values in a first color space are associated with a plurality of sets of coordinate values in a second color space, the second color space being different from the first color space, and
a second-type color-conversion profile including a constant value used in a function for converting values corresponding to coordinate values in the first color space into coordinate values in the second color space, and wherein a data size of the first-type color-conversion profile is larger than that of the second-type color-conversion profile.

3. The scanner device according to claim 1,
wherein the plurality of color-conversion profiles includes:
a first first-type color-conversion profile in which M sets of coordinate values in a first color space are associated with M sets of coordinate values in a second color space, M being an integer which is two or more, the second color space being different from the first color space, and
a second first-type color-conversion profile in which N values corresponding to N sets of coordinate values in the first color space are associated with N sets of coordinate values in the second color space, N being an integer smaller than M, and
wherein a data size of the first first-type color-conversion profile is larger than that of the second first-type color-conversion profile.

4. The scanner device according to claim 3, further comprising:
a memory that stores the first first-type color-conversion profile,
wherein if the original image data has the first resolution, the controller is configured to read the first first-type color-conversion profile from the memory so as to prepare the first first-type color-conversion profile, and
wherein if the original image data has the second resolution, the controller is configured to read the first first-type color-conversion profile from the memory and generate the second first-type color-conversion profile by using the first first-type color-conversion profile so as to prepare the second first-type color-conversion profile.

5. The scanner device according to claim 1,
wherein the particular resolution is determined based on generation condition for generating the original image data, the generation condition being determined by an instruction from a user.

6. The scanner device according to claim 1,
wherein the particular resolution is determined by analyzing image data obtained when the original image data is generated.

7. The scanner device according to claim 1, wherein
the plurality of color-conversion profiles include a high-quality color-conversion profile having a particular data size, the particular data size being greater than the first data size,
the first color-conversion profile is prepared by using the high quality color-conversion profile, and
the second color-conversion profile is prepared by using the high quality color-conversion profile.

8. The scanner device according to claim 7, further comprising:
a memory storing the high quality color-conversion profile.

9. The scanner device according to claim 7, wherein
the high quality color-conversion profile includes a particular number of sets of first coordinate values and second coordinate values, the first coordinate values being in a first color space, the second coordinate values being in a second color space, the second color space being different from the first color space,
the first color-conversion profile is prepared by removing a first number of sets of first coordinate values and second coordinate values from the high quality color-conversion profile, and
the second color-conversion profile is prepared by removing a second number of sets of first coordinate values and second coordinate values from the high quality color-conversion profile, the second number being greater than the first number.

10. The scanner device according to claim 7, wherein each first coordinate value is RGB coordinate value and each second coordinate value is XYZ coordinate value.

11. The scanner device according to claim 10, wherein each RGB coordinate value included in the second color-conversion profile is a constant value.

12. The scanner device according to claim 10, wherein each RGB coordinate value included in the first color-conversion profile is determined such that a first distance between one adjacent pair of RGB coordinate values is equal to a second distance between another adjacent pair of RGB coordinate values.

13. A method executed in a scanner device comprising the steps of:
- controlling the scanner device to scan an original at a particular resolution;
- generating original image data representing the scanned original;
- determining whether the particular resolution is a first resolution or a second resolution, the second resolution being less than the first resolution,
- if the particular resolution is the first resolution,
  - preparing a first color-conversion profile among a plurality of color-conversion profiles having different data sizes, the first color-conversion profile having a first data size; and
  - outputting the original image data and the first color-conversion profile to an outside,
- if the particular resolution is the second resolution,
  - preparing a second color-conversion profile among the plurality of color-conversion profiles, the second color-conversion profile having a second data size, the second data size being less than the first data size and
  - outputting the original image data and the second color-conversion profile to the outside.

14. The method according to claim 13,
wherein the plurality of color-conversion profiles includes:
- a first-type color-conversion profile in which a plurality of sets of coordinate values in a first color space are associated with a plurality of sets of coordinate values in a second color space, the second color space being different from the first color space, and
- a second-type color-conversion profile including a constant value used in a function for converting values corresponding to coordinate values in the first color space into coordinate values in the second color space, and
wherein a data size of the first-type color-conversion profile is larger than that of the second-type color-conversion profile.

15. The method according to claim 13,
wherein the plurality of color-conversion profiles includes:
- a first first-type color-conversion profile in which M sets of coordinate values in a first color space are associated with M sets of coordinate values in a second color space, M being an integer which is two or more, the second color space being different from the first color space, and
- a second first-type color-conversion profile in which N values corresponding to N sets of coordinate values in the first color space are associated with N sets of coordinate values in the second color space, N being an integer smaller than M, and
wherein a data size of the first first-type color-conversion profile is larger than that of the second first-type color-conversion profile.

16. The method according to claim 15,
wherein a memory stores the first first-type color-conversion profile,
wherein if the original image data has the first resolution, the first first-type color-conversion profile is read from the memory in the preparing step, and
wherein if the original image data has the second resolution, the first first-type color-conversion profile is read from the memory and the second first-type color-conversion profile is generated by using the first first-type color-conversion profile in the preparing step.

17. The method according to claim 13,
wherein the particular resolution is determined in the determining step based on generation condition for generating the original image data, the generation condition being determined by an instruction from a user.

18. The method according to claim 13,
wherein the particular resolution is determined in the determining step by analyzing image data obtained when the original image data is generated.

* * * * *